US008886917B1

(12) United States Patent
Binkert et al.

(10) Patent No.: US 8,886,917 B1
(45) Date of Patent: Nov. 11, 2014

(54) SWITCHING TO CORE EXECUTING OS LIKE CODES UPON SYSTEM CALL READING GREATER THAN PREDETERMINED AMOUNT OF DATA

(75) Inventors: Nathan L. Binkert, Redwood City, CA (US); Jeffrey C. Mogul, Menlo Park, CA (US); Jayaram Mudlgonda, San Jose, CA (US); Parthasarathy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 773 days.

(21) Appl. No.: 11/789,785

(22) Filed: Apr. 25, 2007

(51) Int. Cl.
*G06F 9/50* (2006.01)

(52) U.S. Cl.
CPC .............. *G06F 9/50* (2013.01); *G06F 9/5094* (2013.01); *G06F 9/5005* (2013.01)
USPC .............. 712/32; 713/320; 718/104

(58) Field of Classification Search
None
See application file for complete search history.

(56) References Cited

U.S. PATENT DOCUMENTS

| | | | | | |
|---|---|---|---|---|---|
| 5,574,913 | A | * | 11/1996 | Ohtsu | 712/220 |
| 5,761,516 | A | * | 6/1998 | Rostoker et al. | 710/260 |
| 5,835,949 | A | * | 11/1998 | Quattromani et al. | 711/135 |
| 6,240,521 | B1 | * | 5/2001 | Barber et al. | 713/323 |
| 7,093,147 | B2 | * | 8/2006 | Farkas et al. | 713/320 |
| 7,269,831 | B2 | * | 9/2007 | Tanaka et al. | 718/108 |
| 7,596,430 | B2 | * | 9/2009 | Aguilar et al. | 700/299 |
| 7,711,925 | B2 | * | 5/2010 | Ando | 712/34 |
| 7,739,573 | B2 | * | 6/2010 | DeMent et al. | 714/745 |
| 2006/0200651 | A1 | * | 9/2006 | Collopy et al. | 712/220 |
| 2008/0184244 | A1 | * | 7/2008 | Shankar et al. | 718/102 |
| 2008/0244599 | A1 | * | 10/2008 | Hodson et al. | 718/104 |
| 2008/0263324 | A1 | * | 10/2008 | Sutardja et al. | 712/43 |
| 2013/0262902 | A1 | * | 10/2013 | Herdrich et al. | 713/323 |

OTHER PUBLICATIONS

Agerwala T. et al., "Computer Architecture: Challenges and Opportunities for the Next Decade", Digital Library, May/Jun. 2005, vol. 25, No. 3, Abstract only.
Annavaram, M. et al., "Mitigating Amdahl's Law Through EPI Throttling", IEEE 2005.
Barham, P. et al., "Xen and the Art of Virtualization", SOSP'03 ACM 2003.
Binkert, N.L. et al., "The M5 Simulator: Modeling Networked Systems", IEEE Micro, Jul.-Aug. 2006, Abstract only.
Gloy, N. et al., "An Analysis of Dynamic Branch Prediction Schemes on System Workloads", International Conf. on Computer Architecture, 1996, Abstract only.
Chakraborty, K. et al., "Computation Spreading: Employing Hardware Migration to Specialze CMP Cores On-the-Fly", ASPLOS'06, ACM 2006.
Krazit, T., "Intel Pledges 80 Cores in Five Years", News.com, Sep. 2007.
Kumar, R. et al., "Heterogeneous Chip Multiprocessors", IEEE 2005.
Kumar, R. et al., "Single-ISA Heterogenous Multi-Core Architectures for Multithreaded Workload Performace", Jun. 2004.

(Continued)

*Primary Examiner* — Kenneth Kim (57) ABSTRACT

A multi-core processor includes at least one first core and at least one second core. The first core is optimized to run applications, and the second core is optimized to meet the computing demands of operating-system-like code. The first core and the second core execute the same instruction set.

25 Claims, 4 Drawing Sheets

(56) References Cited

OTHER PUBLICATIONS

Ousterhout, J. "Why Aren't Operating Systems Getting Faster as Fast as Hardware?", WRL Technical Note TN-11, Western Research Lab, Oct. 1989.

Redstone, J.A. et al., "An Analysis of Operating System Behavior on a Simultaneous Multithreaded Architecture", Nov. 2000.

Grochowski, E. et al., "Best of Both Latency and Throughput", Apr. 24, 2007.

Nellans, D. et al., "A Case for Increased Operating System Support in Chip Multi-Processors", Apr. 24, 2007.

Rattner, J., "Multi-Core Architectures", Apr. 24, 2007.

* cited by examiner

SWITCHING TO CORE EXECUTING OS LIKE CODES UPON SYSTEM CALL READING GREATER THAN PREDETERMINED AMOUNT OF DATA

This application is related to U.S. Pat. No. 7,093,147, entitled "Dynamically Selecting Processor Cores For Overall Power Efficiency" by Farkas et al., which is incorporated by reference in its entirety.

BACKGROUND

Recent trends in processor designs have favored chip multiprocessors, also referred to as multi-core processors. These include multiple cores all housed in the same package or silicon chip. These cores share some common resources, such as a second level (L2) cache or other caches included in the same package or chip.

The cores in the multi-core processors are typically complex cores. Complex cores are cores optimized around the requirements of application codes, typically to make the applications, such as scientific applications, games, business applications, etc., run as fast as possible. For example, the complex cores may have large pipelines and other features designed to improve application performance.

Typically for applications to run, an operating system (OS) must be first loaded and initialized. Then, the applications may be loaded and run on the OS. Compared to applications, OS code typically does not run proportionately faster on a complex core. In fact, prior research has shown that OS code has not sped up nearly as much as many application programs have, as processor designs have evolved over the past 15-20 years. This is due in part for reasons that OS code typically does not utilize all of the features of complex cores.

Many modern processors use techniques such as branch prediction, caching, out-of-order processing, multithreading, pipelining, and prefetching to improve the performance of applications. Unfortunately, OS's tend not to achieve the improved performance often achieved by conventional applications due to the inherent limitations of these techniques. Below is a brief description of these techniques followed by an explanation as to why OS code does not benefit as much from these techniques as more conventional applications do.

When considering the flow of instructions in a program one can consider both the data flow and the control flow. Data flow refers to how data moves from the output of one operation to the inputs of the next. For example: (1) add A and B, put the result it C; (2) take C and multiply it by 5 and put the result in D; (3) subtract A from D and put the result in E. In this example, the data comes in as A and B where an add is performed. The multiply must wait for the add to produce its result data, and the subtract must wait for the result of the multiply.

Control flow refers to the order of the individual instructions themselves. The previous example's control flow was from instruction (1) to instruction (2) to instruction (3). An example of a more interesting control flow is: (1) if A is true, then do B. (2) Do C." The control flow in this case checks the condition A and may or may not flow through B before flowing to C.

Control flow in applications is represented by the various conditional branch instructions, hereafter referred to as branches, which tell the processor to jump (or not) to a different place in the program. In the previous example, a conditional branch would have been used to skip over B if A was false. Branches occur frequently in most programs and can, on average, be found every fifth or sixth instruction of non-scientific code. The performance of any program depends on a processor's ability to resolve data dependencies by calculating values that are needed to feed subsequent instructions and by resolving control dependencies by calculating conditions for branches.

Branch prediction is the process of guessing the outcome of a conditional branch before the result of the condition is known. This allows a processor to skip over a control dependence and execute instructions that follow the branch while in parallel waiting to verify the prediction. For example, branch predictors use the past pattern of branches to predict the outcomes of future branches. Branch predictors look up the pattern in a table, referred to as the pattern history table. The pattern history table holds past outcomes that indicate what was done the last time a particular pattern was seen. Because the combination of the number, order, and outcome of branches in any given program is very large, branch predictors are limited by the amount of history information that can be maintained in the pattern history table. The larger the program and the more varied the control flow, the more the capacity of the pattern history table is stressed.

Some OS kernels are comparable in size to some of the largest applications. Also, OS code tends to have poor branch prediction behavior because it often stresses the capacity of the pattern history table. The OS itself provides services to the many processes running on top of it, and often either jumps between different tasks, or only has short lived tasks. This leads to a chaotic, difficult to predict control flow. Hence, use of branch predictors and a large pattern history table may result in minimal improvement in performance for an OS unless the pattern history table is made unrealistically large.

Caching uses smaller, faster storage to hold copies of memory locations that have been recently used. A standard analogy for caching describes the stack of file folders on a person's desk as a cache of what is in a set of filing cabinets in a next room. Quite often, the file that is needed is on the person's desk, and if it is not, the person goes to the filing cabinets to get the file, periodically returning some of the files to the filing cabinet so as to limit the number of files on the desk. Going further with this analogy, one can see that a larger cache of files takes longer to search.

Processor caches are fixed in size, and that size is chosen to maximize the likelihood of finding the desired file, while minimizing the search time of the cache. Overall, the goal is to minimize the average time to access a file.

Processors use caches to reduce the amount of time that a load takes, thus more quickly resolving control and data dependencies. OS's, because they must share the cache with regular programs and may go hundreds of thousands of cycles between occasions when they touch a piece of data, often have poor cache behavior. Thus, a large cache may have minimal impact on the performance of an OS unless the cache is made unrealistically large.

Prefetching is the process of issuing a request to the memory system before a particular address is read/written in order to bring that address into the cache. If done far enough in advance of the read or write, the effective latency of that read or write can be reduced. Prefetching comes in several forms, which can be classified as hardware prefetches or software prefetches. Hardware prefetches can be thought of as memory address predictors that use past requests to predict future requests. Software prefetches are generally inserted by the programmer or the compiler and use pre-calculated addresses in advance of the actual load or store request. In both cases, prefetching is used to prepare the cache for a future request.

Using the file folder analogy, prefetching is analogous to the person grabbing a file from the filing cabinet because the person knows that he or she is going to need it later, even though he or she does not need it immediately. Prefetching in general does poorly with what is called pointer chasing code, which is code where the address of a memory request is dependent on the value brought in by a prior memory request. To again continue with the analogy, this is analogous to looking in one file for the name (i.e., a pointer) to another file that has the actual information that is needed. Prefetching does poorly in this situation, because the next file cannot be looked up until the current file is opened. Pointer chasing code is found frequently in OS's and thus the OS often cannot take advantage of prefetching.

In short, several of the techniques that architects often use to improve performance of applications either do not apply very well to typical OS code, or because of its occasional nature of execution, often cannot be taken advantage of. Furthermore, complex cores including the features described above and optimized to run applications faster, generate more heat, consume more power, and use more space on the chip then less complex processors. The increased energy, thermal and spatial costs may be justified by the increased speed of running applications. However, when OS code runs on a complex core, the increased energy and thermal costs of the complex core may not be offset because the OS code may not run faster.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the present invention is described by referring mainly to exemplary embodiments. In the following description, numerous specific details are set forth in order to provide a thorough understanding of the embodiments. It will be apparent however, to one of ordinary skill in the art, that the embodiments may be practiced without limitation to these specific details. Well known methods and structures may not be described in detail, so as not to unnecessarily obscure the description of the embodiments.

According to an embodiment, a multi-core processor includes at least two heterogeneous cores. All the cores use the same instruction set architecture (ISA), however, one of the cores is optimized explicitly for running OS code with greater efficiency, such as with lower energy and thermal costs. The core running the OS code, referred to as the OS core, may be smaller, consume less power, and dissipate less heat than the other core, and have other properties optimized for OS-like code. The two cores may be heterogeneous. For example, the OS core may have smaller caches, a different pipeline and branch predictor, and include other different features that make the OS core optimized for running OS code. Some of these features may allow the OS core to run cooler and consume less power. Furthermore, by using the same ISA in both cores, it is easier to manage the code running on the cores. For example, there is no need to match code written for a particular ISA with a core that can run that ISA.

The multi-core processor may include more than two cores, including at least one OS core. Also, the OS core is assigned to run OS code, because it is optimized to run OS code rather than application code. However, the cores may not be truly dedicated to run one type of code. For example, the complex general purpose core designed to run applications faster, referred to as the complex core, may run OS code in certain situations and the OS core may run some application code. This allows some flexibility at run-time to decide where code runs, although there are performance reasons to favor running OS code on the OS core. Also, the ability to run OS code and application code may be beneficial to prevent constant switching between cores, resulting in wasted cycles.

As described above, OS code may not benefit as much from branch predictors optimized for running applications, larger cache sizes and other complex core features designed to improve application performance. Other types of code that may have some of the properties of OS code described above, similarly may not have significantly improved performance when run on complex cores. This type of code is also assigned to run on the OS core. The code assigned to run on the OS core is referred to as OS-like code and includes OS code and some other types of code. These other types of code include characteristics similar to the OS code, which results in the other types of code not having significantly improved performance if executed on the complex core instead of the OS core. These characteristics are described in further detail below.

OS-like code has recognizable characteristics both at a high level, e.g., visible in source code, and at a low level, e.g., visible at the ISA-level. Many of these characteristics tend to be dynamic. That is, the characteristics are visible in how the code behaves at run time rather than static, such as visible by inspection of the code.

High-level characteristics of OS-like code may include one or more of the following but are not limited to the following characteristics: "straight-through" execution of most code paths, with little or no looping and recursion but possibly frequent branches and subroutine calls; interleaved execution of lots of different code paths, rather than repetitive execution of a small set of paths, e.g., OS-like code may include interrupts used for asynchronous events and frequent context-switching which cause the interleaved execution of code; frequent use of data-dependent conditionals; frequent use of "pointer-following" (or "pointer-chasing") through a complex of interlinked data structures; infrequent accesses to large, regular and/or contiguous blocks of data, except as sources or destinations of block-copy operations; limited or no use of floating-point operations or operands; relatively frequent use of locking operations. Some of these translate directly to the obvious low-level characteristics.

Low-level characteristics of OS-like code may include one or more of the following but are not limited to the following characteristics some of which are the same as high-level characteristics: limited or no use of floating-point operations or operands; relatively frequent use of locking operations; "straight-through" execution of most code paths, with little or no looping and recursion, which results in poor instruction cache (I-cache) locality and many hard-to-predict branches. Low-level characteristics of OS-like code may also include interleaved execution of many different code paths, rather than repetitive execution of a small set of paths. This results in poor I-cache locality and poor branch predictor accuracy or effectiveness. Frequent use of data-dependent conditionals results in poor branch-prediction performance, and lack of opportunities to prefetch data into caches. Frequent use of "pointer-following" or "pointer-chasing" results in poor branch-prediction performance and lack of opportunities to prefetch data into caches. Infrequent use of large, regular and/or contiguous blocks of data, except as sources or destinations of block-copy operations, results in stressing the data cache (D-cache) capacity and results in frequent capacity misses.

Other characteristics of OS-like code include interrupts used for asynchronous events and frequent context-switching, which results in frequent saving and restoring of state (registers, etc.) OS-like code that runs outside the operating system is also often characterized by frequent system interactions (system calls, "signals") relative to other application code and use of event-driven programming models.

Examples of OS-like code are described below. It may be difficult to determine what is "OS-like" code. Some code, such as an OS "kernel", is clearly OS-like, and lots of application code, especially "scientific" code, is pretty clearly not OS-like code, and there are also gray areas in between. The characteristics described above may be used to categorize code. Furthermore, according to an embodiment, all cores execute the same ISA, so a clear separation between "OS-like" code and other kinds of code are not required. Rather, given various shades of OS-like code and various parameters of the underlying hardware, the decision about which core runs which code is performed statically or dynamically with a great deal of flexibility.

Examples of OS-like code include OS code. OS code is the operating system "kernel" or "microkernel". OS-like code that is not OS code may include OS "daemon" code that runs in user mode but is an integral part of the service interface provided by the entire operating system. OS-like code may also include virtual machine support code for creating a virtual machine environment on a server, such as the "Domain 0" component of the Xen Virtual Machine software for creating virtual machines. OS-like code may also include applications, such as web servers and database servers, whose code behaves more like operating systems code than like typical application code. OS-like code may also include library code that behaves more like operating systems code than like typical application code. OS-like code may also include network and/or device driver code that can run as separate thread(s) within the OS, file system code, error checking code and page zeroing code.

Power, size and heat savings may be achieved by using smaller OS cores with fewer features than the other complex cores or using features that are different from similar features in the complex core. For example, the OS core may not include a floating point unit or other types of units that consume power and generate heat. If units, such as a floating point unit, are not included in a core, an emulator may be used to emulate the function of the units. In another embodiment, the two cores are the same. For example, the cores are identical, but the OS core is frequency and/or voltage scaled to run at a slower speed and consume less power.

Figure 1:
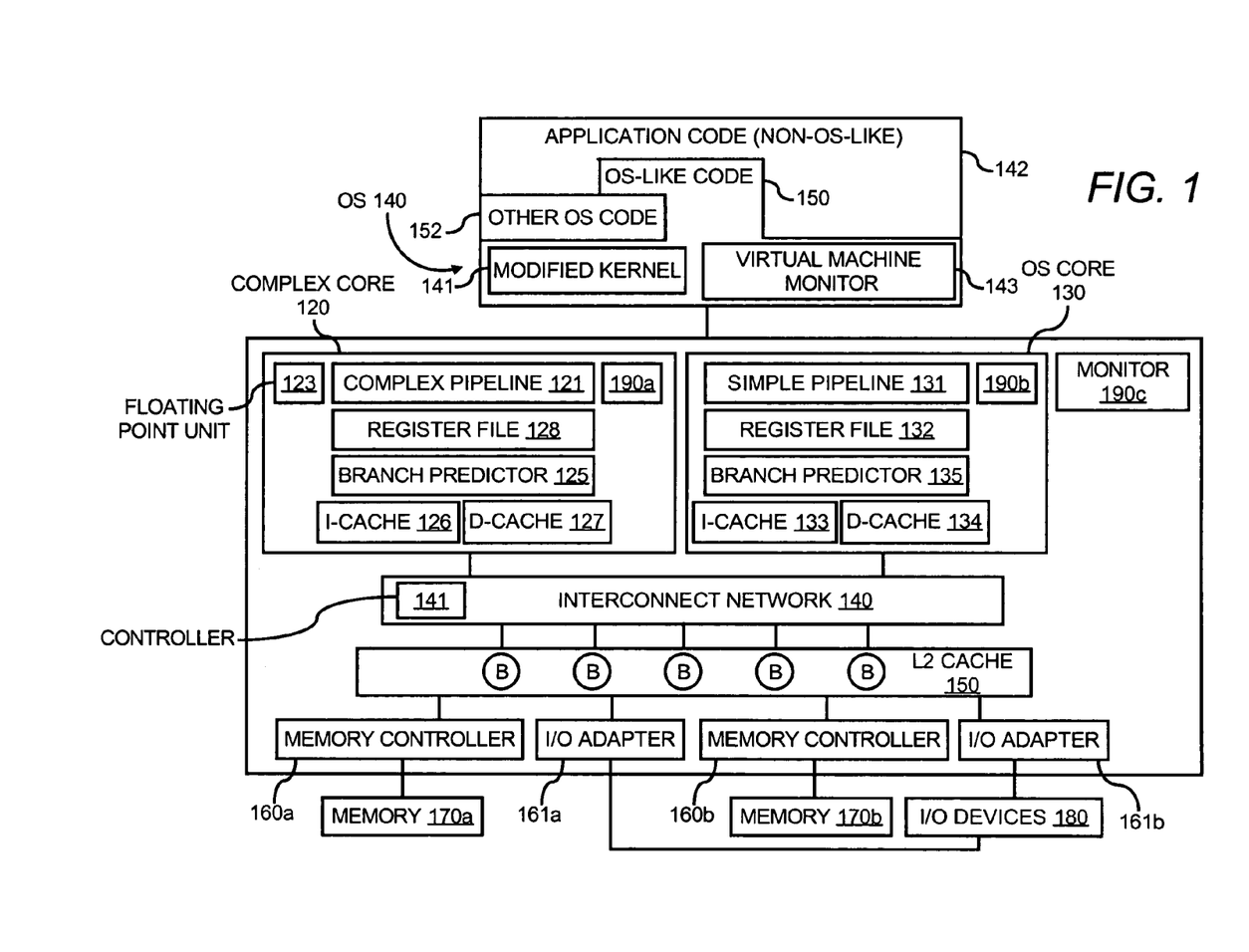
FIG. 1 illustrates a single-chip, multi-core processor, computer system, according to an embodiment.

FIG. 1 illustrates a single-chip, multi-core processor, computer system 100, according to an embodiment. The computer system 100 includes software and hardware. The hardware includes a multi-core processor 110. The multi-core processor 110 includes at least two cores 120 and 130 running the same instruction set. The core 120 is referred to as a "complex" core and is optimized to run applications. The core 130 is a "simple" core, referred to as the OS core, and is optimized to only run OS-like code but may be operable to run other types of code. The optimizations of the OS core include physical optimizations such as smaller size, less hardware or similar hardware with different capacity, and other hardware changes. As a result of being optimized to run OS-like code, the OS core 130 may be smaller in size, consume less power and dissipate less heat than the complex core 120.

One of ordinary skill in the art will readily recognize that the cores shown in FIG. 1 and the processor and computer system in general may include other features not shown. The features shown are provided by way of example to illustrate some possible differences between a complex core and an OS core.

The complex core 120 is optimized to provide higher performance for applications. For example, the complex core 120 may include a complex pipeline 121, a branch predictor 125 optimized for running applications, a floating point unit 123, a register file 128, an I-cache 126 and a D-cache 127. The OS core 130 is optimized to run OS-like code. For example, the OS core 130 may include a simple pipeline 131, a register file 132, an I-cache 133, a D-cache 134, and a branch predictor 135.

The complex core 120 may include a floating point unit 123, and the OS core 130 may not include a floating point unit. The OS core 130 may include a branch predictor 135 but the branch predictor 135 is optimized for OS-like code. For example, the branch predictor 135 may be smaller and/or use different methods for performing branch prediction when compared to the branch predictor 125. The size of prediction tables for the branch predictors 125 and 135 may also be different.

The simple pipeline 131 may be much shallower than the complex pipeline 121. For example, the simple pipeline 131 may include a classic 5 stage pipeline, such as provided in the "486" processor. The complex pipeline 121 is much deeper. For example, the complex pipeline may be 20 to 30 stages deep, because deep pipelines provides better performance for applications with predictable or infrequent branch behavior, but worse performance for code with frequent and hard-to-predict branches, as is typical with OS-like code. The smaller simple pipeline 131 can potentially achieve performance close to that of the complex pipeline 121 when running OS-like code, but with significant power and area savings.

The register files 128 and 132 may store different values. For example, the register file 128 in the complex core 120 may store integer values (INT), floating point values (FP) and media processing (MP) values. The register file 132 in the OS core 130 may be smaller and not store all the data types that may be stored in the register file 128. For example, the register file 132 may not store MP or FP values because the OS core 130 does not include a floating point unit or a media processor.

OS-like code tends to have different cache behavior than application code. For example, the kernel has much less data-cache locality than application code. An OS is less likely to reuse recently used data, which is typically cached, than an application. Thus, the OS core 130 may be optimized by having smaller caches. For the OS core 130, the cache sizes may be optimized for OS-like code. For example, a large I-cache might capture a large proportion of OS instruction references. Thus, the I-cache 133 may be larger than the I-cache 126 in the complex core 120. The D-cache 134 may be smaller than the D-cache 127. Caches exist at multiple levels in and outside the chip 110. Some caches may be in the core and some may be outside the core and may be shared by multiple cores. Also, some may have specific functions, such as I-caches and D-caches. Caches may be optimized for an OS core or a complex core, for example, by providing caches with different sizes, or for a shared cache, prioritizing access to the cache and dynamically assigning portions of the cache to a core based on its needs.

The chip 110 may include an interconnect network 140 and controller 141 for connecting the cores to an L2 cache 150 and other controllers and adapters. The interconnect network 140 is a shared single pool of resources, e.g., such as logic and conductors, connecting cores to other hardware, such as caches, shared memory, private memory, I/O, etc. The controller 141 may perform bus arbitration and prioritization for requests from the cores 120 and 130. For example, the controller 141 may institute policies for prioritizing which core gets access to the interconnect network 140 and the L2 cache 150 when there are conflicts. Also, the L2 cache 150 may be divided into banks, each assigned to a particular core. The controller 141 provides a core with access to the corresponding bank(s). In one embodiment, the interconnect network 140 is dynamically reconfigurable to connect a core with certain banks in the L2 cache 150 depending on the core's cache requirements.

The chip 110 may also include memory controllers 160a and 160b and I/O adapters 161a and 161b for connecting the cores 120 and 130 to main memory 170a and 170b and I/O devices 180. The number of memory controllers and I/O adapters may vary depending on the number of cores in the chip 110. OS-like code, including OS code, and applications may reside in main memory during execution and use caches in the chip 110. Also, the branch predictors 125 and 135 are self-contained structures in their respective cores.

The chip 110 may include monitors 190a-c. The monitors 190a-c may include conventional hardware and software for monitoring hardware and performance for chip 110. In one embodiment, the information captured by the monitors 190a-c is used to determine when to switch processing between the complex core 120 and the OS core 130. For example, the information may be used to identify the type of code, e.g., OS-like code or non-OS-like code, running on a core, and based on the type of code a determination is made to switch processing to another core. In another embodiment, the information captured by the monitors 190a-c is used to determine the characteristics of code running on a core. If the code exhibits characteristics of OS-like code, processing may be switched to an OS-core. If the code exhibits characteristics of non-OS-like code, such as application code, processing may be switched to a complex core. These determinations may be performed by a modified kernel described below. Some examples of information captured by the monitors 190a-c include cache miss rate, monitoring of process and thread startup and exit, including exit status codes, branch prediction monitoring, monitoring core frequency and voltage, etc.

The software executed by the complex core 120 and the OS core 130 is also shown in FIG. 1, according to an embodiment. For example, an operating system 140 with a modified kernel 141 runs on all cores in the system, as a single parallel program. In an alternate embodiment, each core runs its own instance of the OS code, and the cores communicate as in a "clustered" system. In yet another embodiment, only OS cores run OS's; complex cores only run application code, with a trap handler that immediately switches to an OS core if the application needs to interact with an OS.) The complex core 120 also executes the applications 142. The OS core 130 typically runs parts of the operating system 140, including the modified kernel 141. As shown in FIG. 1, the OS-like code 150 may include the OS 140 with a modified kernel 141 and/or a virtual machine monitor 143 which creates a virtual machine environment for running virtual machines. The OS-like code 150 may include other OS code 150, which may be code, such as daemons, libraries, drivers, file system code, virtual memory code and possibly other code traditionally in an OS. The OS-like code 150 may also include portions of web servers and database servers. The chip 110 which represents a multi-core processor may optionally be connected to one or more identical, similar, or different processors to extend the multiprocessing system, as is typically done with single-core and multi-core processors. In such a multi-CPU-chip system, the operating system kernel 141 runs as a single parallel program spanning all of the cores, or as a cluster of independent kernels each spanning one or more cores.

The OS core 130 may also execute an emulator 160. For example, if the OS core 130 does not include a floating point unit, the emulator 160 may emulate a floating point unit for executing floating point code if needed. However, floating point code would typically be executed on the complex core 120. Other types of emulators may also be provided to emulate different units.

The modified kernel 141 executed by the complex core 130 is operable to switch processes when executing OS-like code to the OS core 130 and power down/up or scale down/up cores as needed. For example, interrupt code, also referred to as bottom-half code, is preferably executed on the OS core 130. The modified kernel 141 recognizes interrupt code and provides interrupt delivery to the OS core 130 for execution of the interrupt code.

For top-half code, the modified kernel 141 decides when to run top-half code on a different core from the application. Switching cores takes time, because (1) this involves executing extra instructions; (2) it might require transferring some state between CPUs; and (3) if the target core is powered down, it could take about a thousand cycles to power up. According to an embodiment, switching is performed for top-half code comprised of expensive, frequent system calls to compensate for losing cycles during the switch (i.e., overhead). Examples of system calls that may be switched to the OS core 130 from the complex core 120 include open, select, sendfile, write, read, poll, close, stat64, writev, socket call, and lstat64.

Factors for determining which system calls merit switching may include number of cycles to execute the call, frequency of the call, applications being executed and making the calls, architectures, kernel versions, etc. Testing may be performed to determine which code merits switching. Metrics, such as total energy consumed, total elapsed time to run a workload, and throughput-per-joule, which is total energy consumed multiplied by total elapsed time to run a workload, may be used to select processes to switch to the OS core 130. OS-like user code may also be switched to the OS core 130.

Power consumption and monitoring and switching processes between cores are described in greater detail in U.S. Pat. No. 7,093,147, which is incorporated by reference.

According to an embodiment, top-half system calls operable to be switched to the OS core 130 are predetermined and stored. The modified kernel 141 identifies a predetermined system call when received and switches the process to the OS core 130.

For example, the modified kernel 141 includes a bitmap, indexed by system call number, of the predetermined system calls, which allows the modified kernel 141 to identify and mark system calls for switching. On entry to each marked system call, the process is migrated to the OS core 130 by blocking the process, placing it in a queue of migratable processes, and then exploiting migration functions, which may exist in kernels designed to run on multi-core processors, to carry out the actual core switch. The process is migrated back upon system call exit, returning if possible to the original core, such as the complex core 120, to preserve cache affinity. In some cases, such as when multiple user-level processes or threads are operable to be executed for a complex core, the migration of the process back to the original core may be deferred until a later point, such as a scheduling event.

The modified kernel 141 may also be operable to power down/up cores and determine when to do so. In one embodiment, an adaptive approach is taken. For example, if the OS 140 expects to return quickly to one of the applications 142, the OS 140 keeps the complex core 120 powered up. However, if the OS 140 expects not to return quickly to any application on the complex core 120, the OS 140 may choose to power down the complex core 120. The OS 140 may not expect to return "quickly" if the application is blocked, for example, on a disk I/O action. Also, the modified kernel 141 may track the rates of system calls and interrupts. If the combined rate is below a threshold, the OS core 130 is powered down. If the rate exceeds a threshold, the OS core 130 remains powered up. One alternative to completely powering down a core is to reduce the core's voltage and frequency through known frequency scaling. This should allow the core to resume normal operation very rapidly, although it does not eliminate leakage current as much as a complete power-down would. However, frequency scaling conserves power. For example, a simple EV4-like processor consumes approximately 1.78 watts at 750 MHz and 7.1 watts at 3 GHz. A complex EV6-like processor consumes approximately 6.4 watts at 750 MHz and 25.4 watts at 3 GHz.

Figure 2:
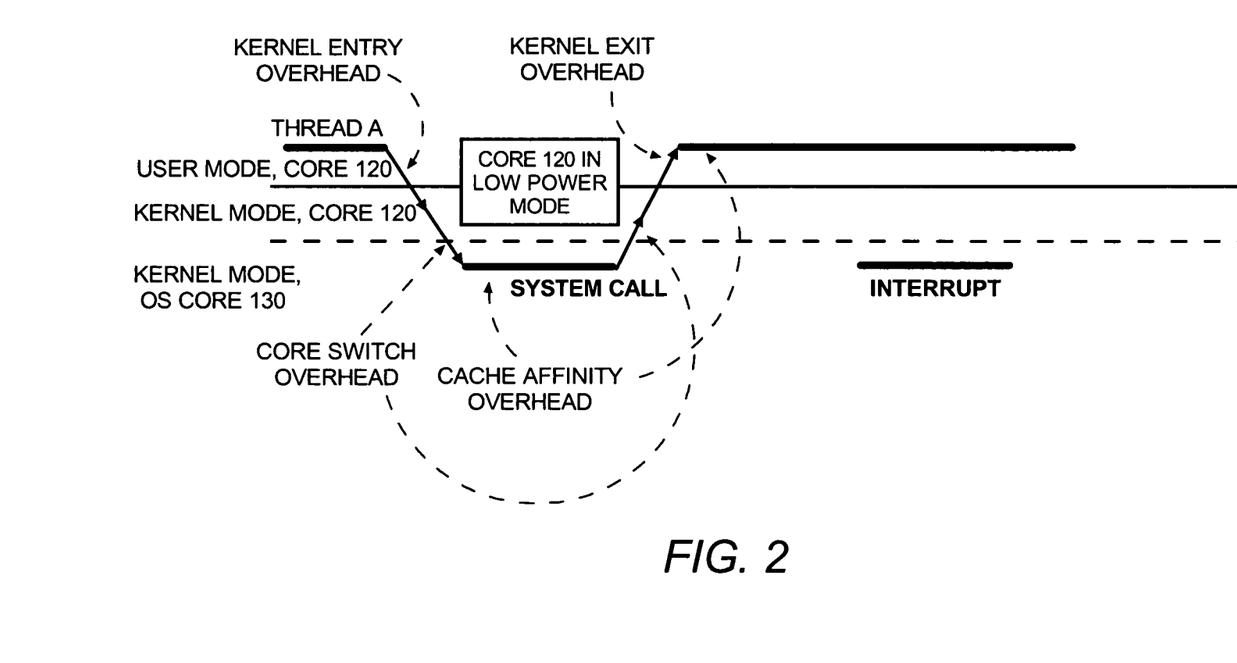
FIG. 2 illustrates overhead when switching between cores to run processes and an OS core processing an interrupt, according to an embodiment.

FIG. 2 shows overhead when switching between cores and interrupt processing, according to an embodiment. A thread A, including application code, is running on the complex core 120. The application runs in user mode on the complex core 120 and does not have privileges to perform privileged functions.

The application makes a system call. The system call, for example, is one of the predetermined system calls that is preferably executed by the OS core 130. The system call causes the OS 140 to enter into kernel mode, incurring standard kernel entry overhead. The modified kernel 141 identifies the system call as one of the predetermined system calls and transfers the process to the OS core 130. In another embodiment, the decision to switch cores for certain system calls may be deferred until part of the system call has been executed, and the modified kernel 141 decides that this particular invocation of the system call is likely to run more efficiently on the OS core 130. The decision to switch may be based on information gathered by the monitors 190*a-c* shown in FIG. 1. For example, if the modified kernel 141 determines a read system call is for a small amount of data, it may not switch processing to the OS core 130. However, if a large amount of data is being read, then the read system call is switched to the OS core 130. In yet another embodiment, the decision to switch cores may depend on the particular application 142 that is running. For example, each application process may have its own table listing predetermined system calls for which to switch cores. In yet another embodiment, the per-application decision procedure is dynamically adjusted. For example, the modified kernel 141 might change its decision to switch cores for a particular system call and a particular application 142 based on its observations of previous behavior of that application or of the specific process. One or more of the embodiments described herein may be combined. There is core switch overhead and cache affinity overhead when switching the process to the OS core 130. Upon exit of the system call, the processing is returned to the complex core 120, resulting in core-switch overhead, cache affinity overhead, and kernel exit overhead.

Also, as shown, the OS core 130 may be used to perform certain kinds of interrupts. In such cases, the application running on the complex core continues to run without disruption. Also, the core 120 may be placed in a low power mode when the system call process is being executed by the OS core 130. Although not shown, the OS core 130 may be placed in low power mode when idle. If the OS core 130 is in low power mode when an interrupt arrives for it, the hardware implementation of the multi-core processor 110 may wake up OS core 130 in order for it to handle the interrupt, or it may deliver the interrupt to a different, powered-up, core, such as a different OS core or an application core, if that is more expedient. Some OS's, such as LINUX, provide the ability to assign interrupts to a particular CPU or core. In another embodiment, if multiple threads may be executed by the complex core 120, instead of placing the complex core 120 in a low power mode, the complex core 120 runs a different thread.

Figure 3:
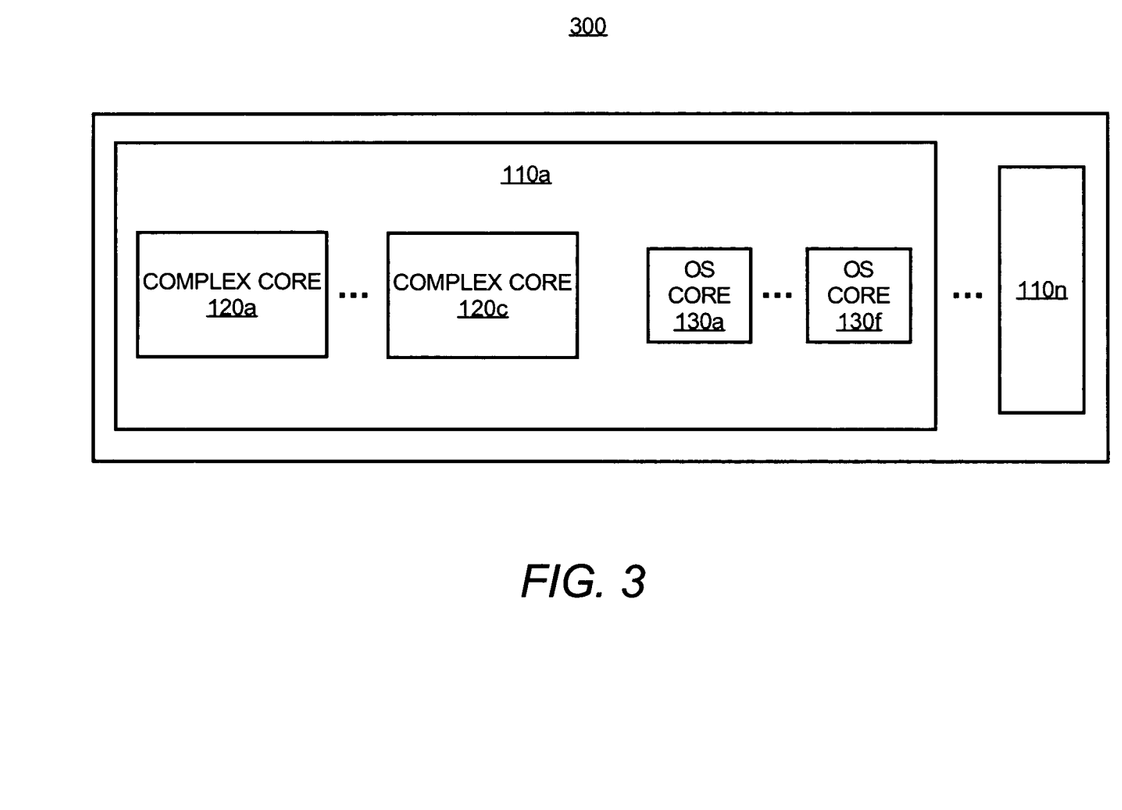
FIG. 3 illustrates a multi-processor computer system including one or more multi-core processors, according to an embodiment.

FIG. 3 illustrates a multi-processor (also referred to as multi-CPU or multi-chip) computer system including one or more multi-core processors with multiple complex cores 120*a-c* and multiple OS cores 130*a-f*, according to an embodiment. FIG. 3 is provided to illustrate that the system 100 may include multiple complex cores and/or multiple OS cores and also multiple processors 110*a-n*. In one embodiment, each OS core is assigned to run a particular type of OS-like code. For example, the OS core 130*a* runs OS code and the OS core 130*b* runs libraries, etc. In an alternative embodiment, the OS core and library code could be arbitrarily mixed between the multiple OS cores. An OS core may be assigned to run a particular type of OS-like code based on its connections. For example, if an OS core has no path to an I/O adapter, then that OS core does not perform functions for providing access to an I/O device.

Also, one or more of the cores may include some form of fault tolerance. Fault tolerance may be provided as redundant cores, such as redundant OS cores providing the same functions. Fault tolerance may be provided by including conventional fault tolerance logic and error checking code for cores and/or caches or other hardware.

Also, one of the processors of 110*a-n* may include a hybrid of a complex core and an OS core. For example, the processor may have features of both an OS core and a complex core, such as smaller caches and a floating point unit. A general purpose core may be a hybrid of a complex core and an OS core or may be a complex core or an OS core operable to perform functions of other types of cores.

Also, although the interconnect network and other features of the chip 110 and features outside the chip 110 shown in FIG. 1 are not shown in FIG. 3, these features may be included in the computer system 300. Also, certain features may be modified. For example, paths in the interconnect network 140 shown in FIG. 1 may be customized, such as based on capacity and directness, for a particular core or processor. For example, if an OS core is dedicated to perform read system calls for large amounts of data, the interconnect network may have paths with greater capacity for that OS core.

Figure 4:
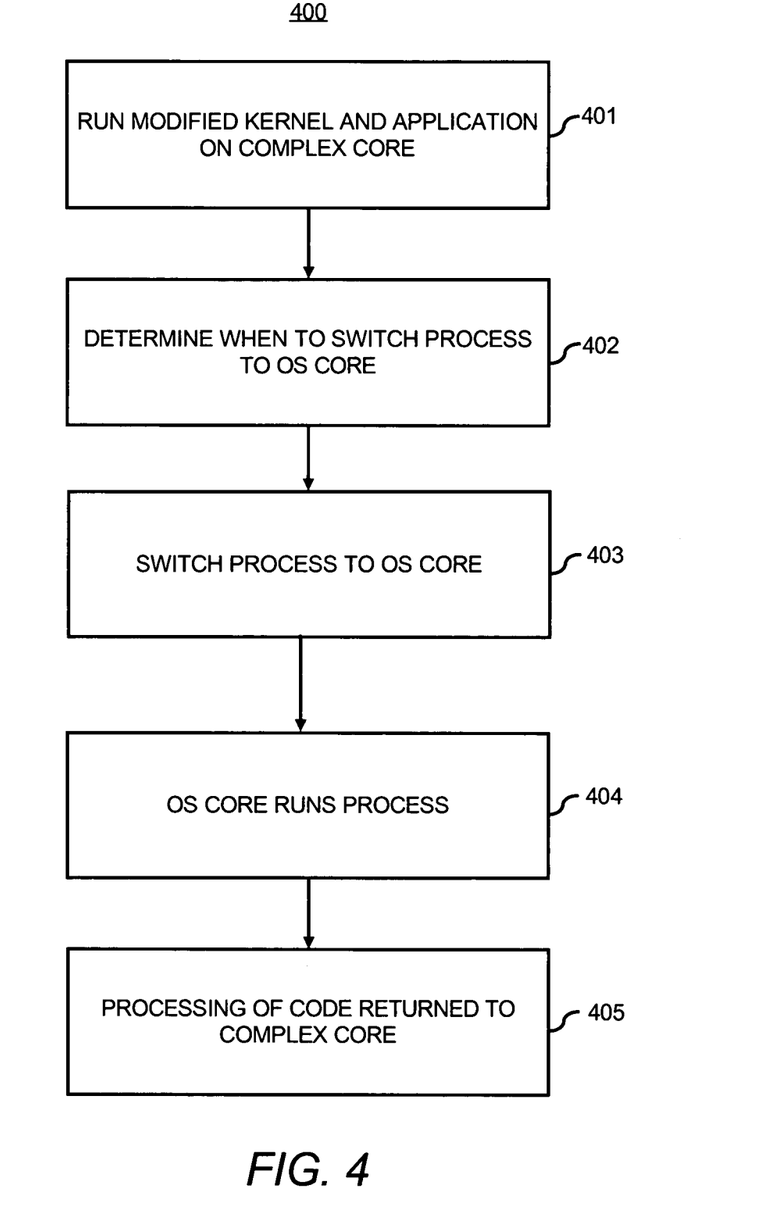
FIG. 4 illustrates a flow chart of method for switching between cores to run processes in a multi-core processor, according to an embodiment.

FIG. 4 illustrates a method 400 for switching between cores, according to an embodiment. The method 400 is described with respect to FIG. 1 by way of example and not limitation. The method 400 may be performed on other multi-core systems having similar core properties.

At step 401, the complex core 120 shown in FIG. 1 runs the modified kernel 141 and one or more applications 142.

At step 402, the modified kernel 141 determines when to switch a process to the OS core 130. For example, for top-half system calls, the modified kernel 141 stores a list of system calls, which may be in the form of a bitmap. If a system call is detected, the modified kernel 141 determines to switch the process to the OS core 130. The list may be static or dynamic and may be different for different processes, as described above. Also, a decision to switch cores may be made after processing is started.

At step 403, the process is switched to the OS core 130. Transferring workload, such as the process, to another core includes powering up the core if the core is powered down. If the core is frequency scaled, the core may be returned to its optimum frequency and/or voltage for processing code. If the workload is for an application, the state of the application process or thread is saved to memory. One core may signal to the other core when to switch and start performing functions to start the switch. In one embodiment, this is done by placing the process on a designated queue, then alerting the other processor that it should dequeue the process and continue to run its kernel code. When it is ready, software control is transferred to the other core. The original, previous, core may be powered down.

At step 404, the OS core 130 runs the process, and at step 405, processing is returned to the complex core 120. When the processing is returned to the original core, the application execution begins immediately after the point it reached just prior to the transfer.

One or more of the steps of the method 400 and other steps described herein may be implemented as software embedded on a computer readable medium, such as memory 160, and executed, for example, by a processor, such as the multi-core processor 110. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A multi-core processor comprising:
   a first core to execute application code, wherein the first core includes a floating point unit to execute floating point code; and
   a second core to execute only operating-system-like (OS-like) code, wherein the OS-like code includes OS code and at least one other type of code that exhibits characteristics of the OS code, wherein the second core does not include a floating point unit,
   wherein the first core and the second core execute the same instruction set, and
   wherein the first core is to process a system call that includes OS-like code, and the process of the system call is switched from the first core to the second core in response to a determination that an amount of data to be read by the system call is greater than a predetermined amount.

2. The multi-core processor of claim 1, wherein the second core consumes less power and dissipates less heat than the first core.

3. The multi-core processor of claim 1, wherein one or more of the first core and the second core are fault tolerant.

4. The multi-core processor of claim 1, further comprising:
   a floating point emulator to be executed by the second core to allow the second core to execute floating point code.

5. The multi-core processor of claim 1, further comprising:
   a first cache to be used by the first core; and
   a second cache to be used by the second core, wherein the second cache is smaller in size than the first cache.

6. The multi-core processor of claim 5, wherein the first cache and the second cache comprise a single reconfigurable cache where portions of the cache are dynamically allocated to the first core and the second core.

7. The multi-core processor of claim 1, further comprising:
   a first pipeline in the first core;
   a second pipeline in the second core, wherein the first pipeline is smaller than the second pipeline.

8. The multi-core processor of claim 1, further comprising:
   a first branch predictor to be used by the first core; and
   a second branch predictor to be used by the second core, wherein a prediction method and size of prediction tables of the first branch predictor are different from the second branch predictor.

9. The multi-core processor of claim 1, further comprising:
   a first register file to be used by the first core; and
   a second different register file to be used by the second core, wherein the first register file is different from second register file in the data types it operates on or in size or organization.

10. The multi-core processor of claim 1, further comprising:
    an interconnect network connecting the first core and the second core to other resources; and
    a controller to prioritize requests from the first core and the second core for communicating with other resources via the interconnect network based on polices.

11. The multi-core processor of claim 10, wherein the interconnect network includes paths having different capacities and directness to different resources for different cores in the multi-core processor.

12. The multi-core processor of claim 1, further comprising:
    a single parallel OS, including a modified kernel, running on all the cores in the multi-core processor.

13. The multi-core processor of claim 1, wherein each core in the multi-core processor runs its own instance of an OS.

14. The multi-core processor of claim 1, wherein the first core only runs application code, with a trap handler that immediately switches to the second core if an application needs to interact with an OS.

15. The multi-core processor of claim 1, wherein there are more than one second cores and each of the second cores is assigned to run a particular type of OS-like code.

16. The multi-core processor of claim 1, wherein one or more of the first core and the second core is to be powered down or scaled to run at a slower speed if OS-like code is expected to not be executed within a predetermined amount of time.

17. The multi-core processor of claim 1, wherein software running on the first core tracks rates of system calls and interrupts and,
   in response to a combined rate of system calls and interrupts being below a predetermined threshold, the second core is powered down.

18. The multi-core processor of claim 1, wherein the at least one other type of code that exhibits characteristics of OS code is a type of code that does not allow the at least one other type of code to have improved performance if executed on the first core.

19. The multi-core processor of claim 18, wherein the characteristics exhibited by the at least one other type of code comprise at least some of "straight-through" execution of most code paths;
   interleaved execution of lots of different code paths;
   interrupts used for asynchronous events;
   frequent context-switching;
   frequent use of data-dependent conditionals;
   frequent use of pointer-chasing;
   infrequent use of large, regular and/or contiguous blocks of data;
   limited or no use of floating-point operations or operands;
   relatively frequent use of locking operations.

20. A method of switching between cores in a multi-core processor including a first core to execute applications, and a second core to execute only operating-system-like (OS-like) code, wherein the OS-like code includes OS code and at least one other type of code that exhibits characteristics of the OS code, wherein the first core and the second core execute the same instruction set, the method comprising:
   running a kernel and an application on the first core;
   detecting, by the kernel, that the application running on the first core makes a system call including OS-like code;
   determining, by the kernel, whether an amount of data to be read by the system call is greater than a predetermined amount;
   in response to a determination that the amount of data to be read by the system call is greater than the predetermined amount, switching a process of the system call for the application from the first core to the second core;
   running the process of the system call in the second core; and
   in response to a completion of the process of the system call, switching processing for the application from the second core back to the first core.

21. The method of claim 20, further comprising:
   storing a list of predetermined system calls.

22. The method of claim 21, further comprising:
   determining the predetermined system calls based on a time to perform each system call and energy consumed to perform each system call.

23. The method of claim 21, wherein the list of predetermined system calls is different for different processes and one or more of the lists is generated based on monitoring a core running the process to identify characteristics of OS-like code.

24. The method of claim 20, further comprising:
   powering down or frequency scaling one of the first core and the second core to run at a slower speed if the OS-like code is expected to not be executed within a predetermined amount of time in the future.

25. A computer system comprising:
   a multi-core processor including a first core to execute applications and a second core to execute only operating-system-like (OS-like) code, wherein the OS-like code includes OS code and at least one other type of code that exhibits characteristics of the OS code, wherein the first core and the second core execute the same instruction set, and wherein the first core includes a floating point unit to execute floating point code and the second core does not include a floating point unit; and
   a kernel to run on the first core and switch a process of a system call including OS-like code from the first core to the second core in response to a determination that an amount of data to be read by the system call is greater than a predetermined amount.

* * * * *